United States Patent
Zhang et al.

(10) Patent No.: US 10,147,161 B2
(45) Date of Patent: Dec. 4, 2018

(54) INTELLIGIBILITY OF MESSAGES

(71) Applicant: Nokia Technologies Oy, Espoo (FI)

(72) Inventors: Liang Zhang, Beijing (CN); Yannis Paniaras, Vienna, VA (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 14/898,233

(22) PCT Filed: Jun. 19, 2013

(86) PCT No.: PCT/CN2013/077452
§ 371 (c)(1),
(2) Date: Dec. 14, 2015

(87) PCT Pub. No.: WO2014/201629
PCT Pub. Date: Dec. 24, 2014

(65) Prior Publication Data
US 2016/0132990 A1    May 12, 2016

(51) Int. Cl.
G06T 3/00 (2006.01)
H04W 4/18 (2009.01)
(Continued)

(52) U.S. Cl.
CPC ............ G06T 3/0093 (2013.01); G09G 5/00 (2013.01); G09G 5/373 (2013.01); H04L 51/16 (2013.01);
(Continued)

(58) Field of Classification Search
CPC ....... G06T 3/0093; H04L 51/16; G09G 5/373; G09G 5/00; G09G 2340/0464;
(Continued)

(56) References Cited

U.S. PATENT DOCUMENTS 7,805,673 B2 * 9/2010 der Quaeler ...... G06F 17/30634
715/255
2008/0167084 A1 7/2008 Lee et al.
(Continued)

FOREIGN PATENT DOCUMENTS

CN 1275042 A 11/2000
CN 1855894 A 11/2006

OTHER PUBLICATIONS

International Search Report and Written Opinion received for corresponding Patent Cooperation Treaty Application No. PCT/CN2013/077452, dated Mar. 27, 2014, 10 pages.

Primary Examiner — Maurice L. McDowell, Jr.
(74) Attorney, Agent, or Firm — Alston & Bird LLP

(57) ABSTRACT

An apparatus, the apparatus comprising at least one processor, and at least one memory including computer program code, the at least one memory and the computer program code configured, with the at least one processor, to cause the apparatus to perform at least the following: based on the determined age of a particular message in a displayed message thread, provide for a change in the intelligibility of at least part of the particular message with respect to one or more of: at least one of the other of the messages in the displayed message thread; and at least some of the other part of the particular message.

20 Claims, 8 Drawing Sheets

---

1100

Based on the determined age of a particular message in a displayed message thread, providing for a change in the intelligibility of at least a part of the particular message with respect to one or more of:

at least one of the other of the messages in the displayed thread; and at least some of the other part of the particular message.

(51) Int. Cl.
*H04W 4/12* (2009.01)
*H04W 12/02* (2009.01)
*G09G 5/00* (2006.01)
*G09G 5/373* (2006.01)
*H04L 12/58* (2006.01)

(52) U.S. Cl.
CPC ............... *H04W 4/12* (2013.01); *H04W 4/18* (2013.01); *H04W 12/02* (2013.01); *G09G 2340/04* (2013.01); *G09G 2340/0464* (2013.01); *G09G 2340/14* (2013.01); *G09G 2358/00* (2013.01)

(58) Field of Classification Search
CPC ........... G09G 2340/14; G09G 2340/04; G09G 2358/00; H04W 4/12; H04W 12/02; H04W 4/18
See application file for complete search history.

(56) References Cited

U.S. PATENT DOCUMENTS

| | | | | |
|---|---|---|---|---|
| 2008/0201649 A1* | 8/2008 | Mattila | ............... | G06F 3/04817 715/763 |
| 2012/0028659 A1* | 2/2012 | Whitney | ........... | H04M 1/72547 455/466 |
| 2014/0067965 A1* | 3/2014 | Yamakawa | ............. | H04L 51/04 709/206 |

* cited by examiner

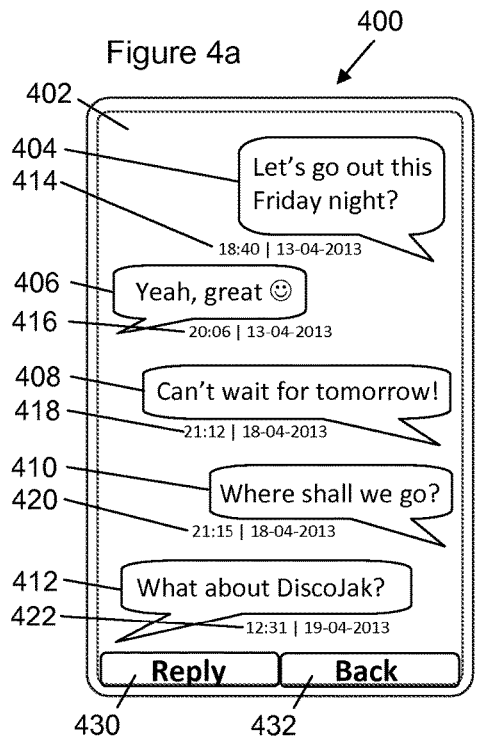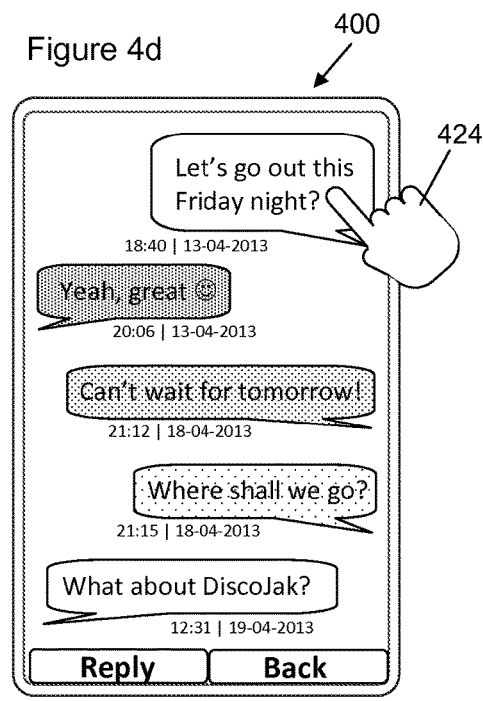

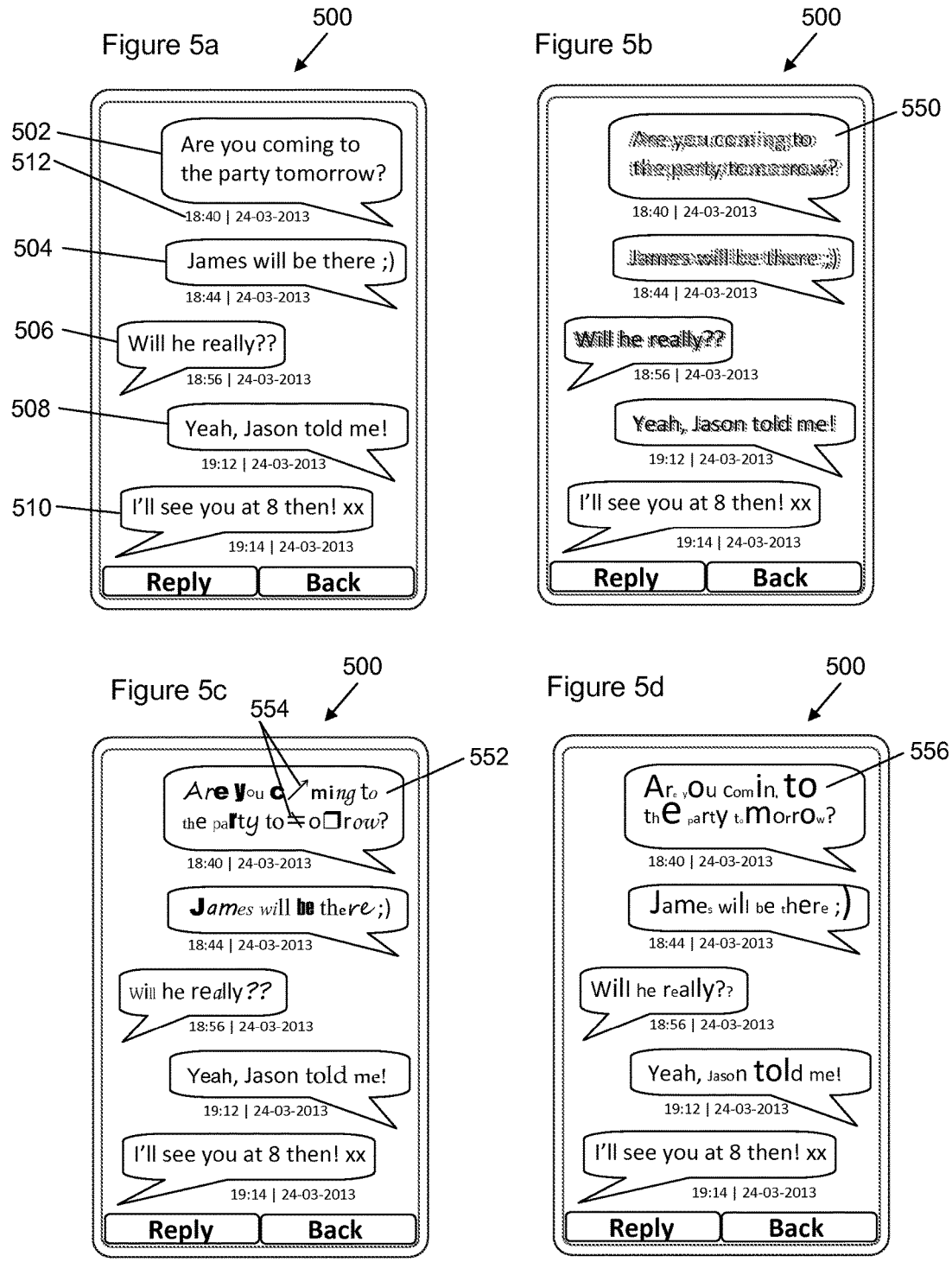

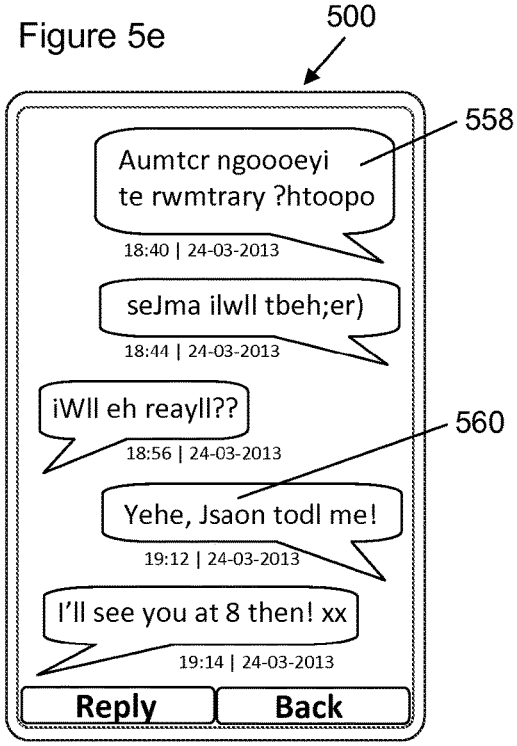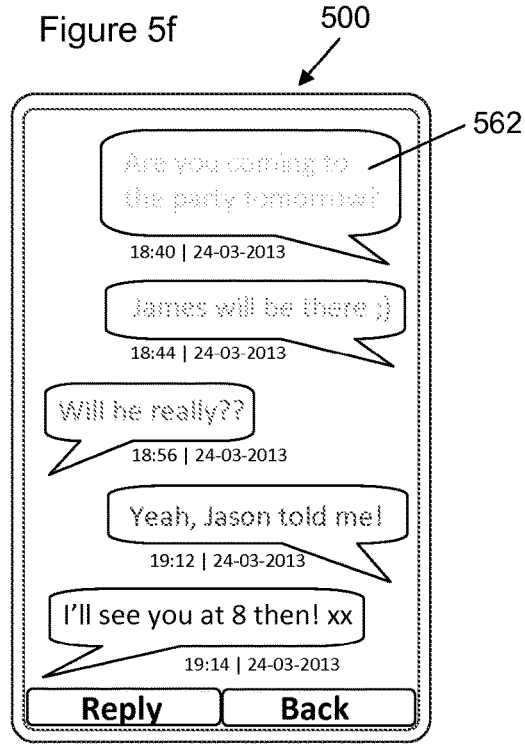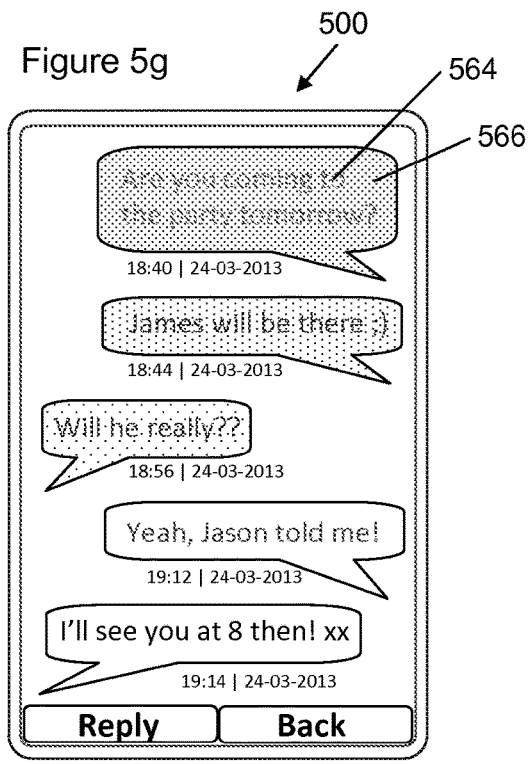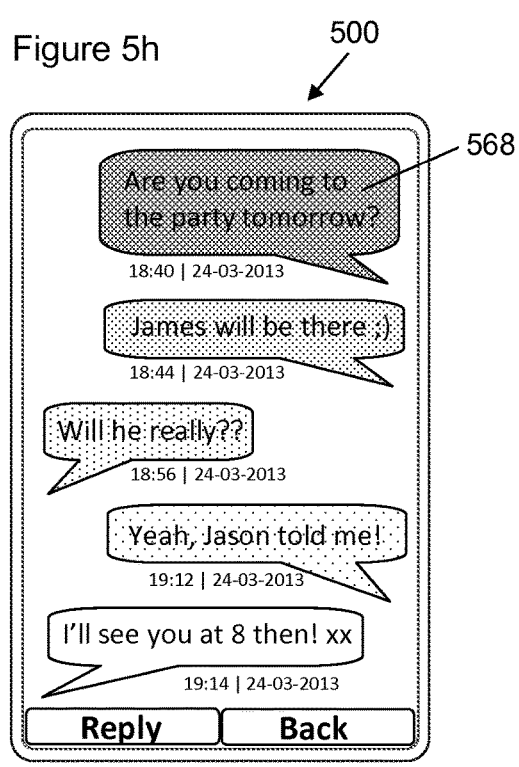

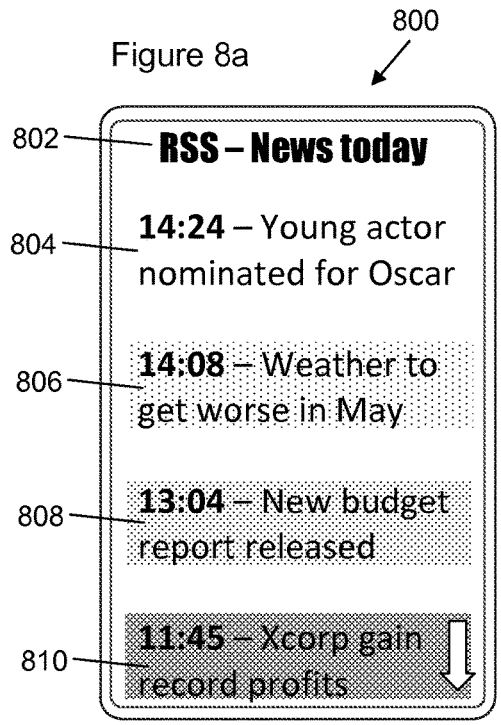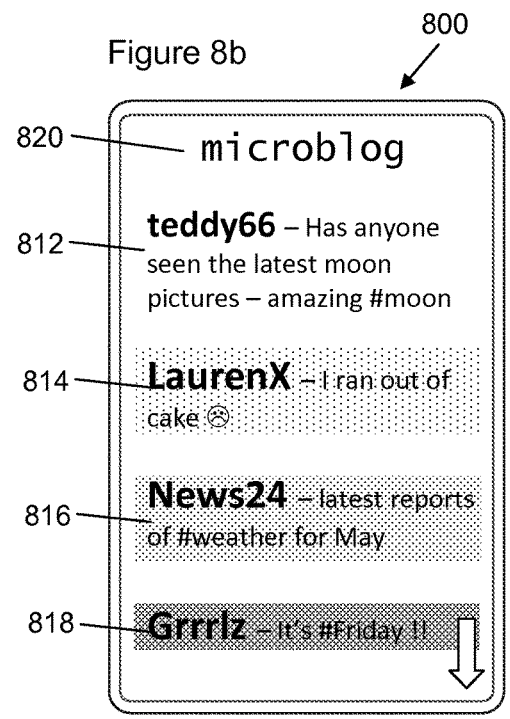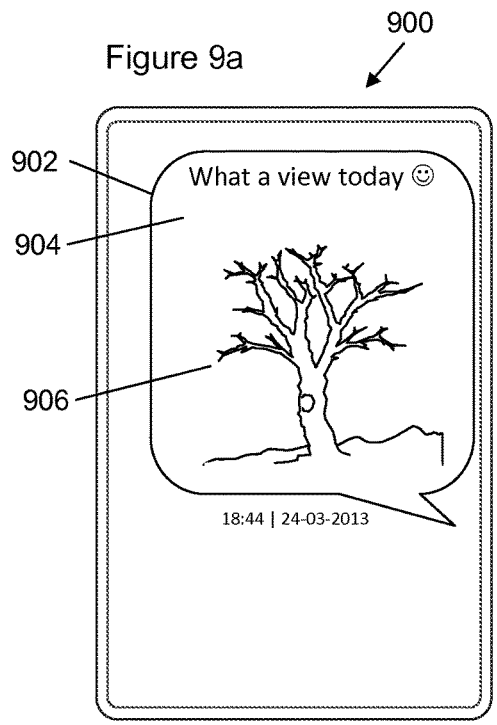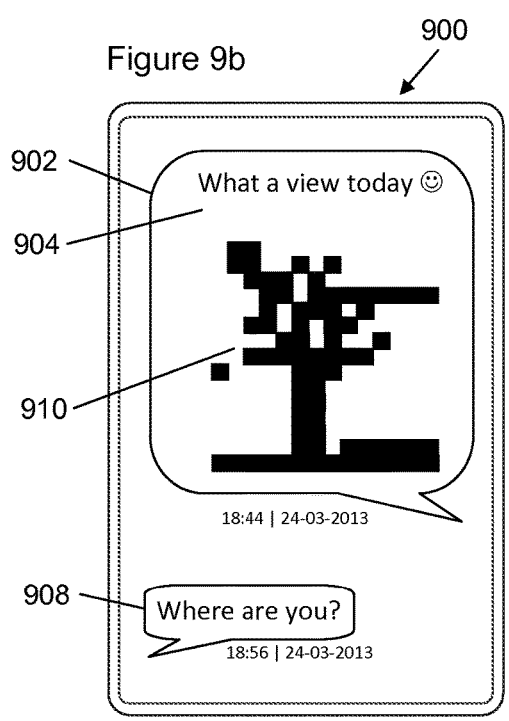

Figure 10a
Figure 10b
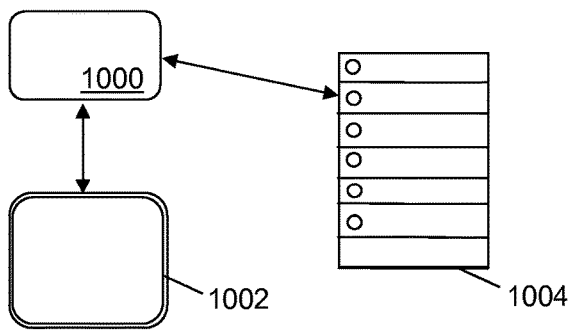
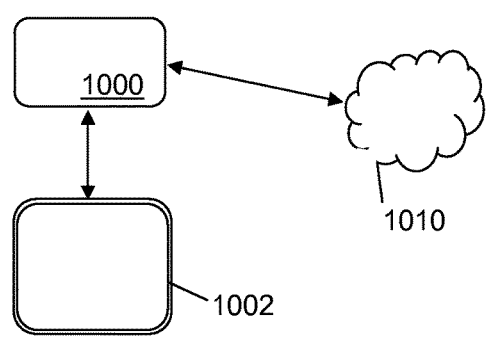
Figure 11
Based on the determined age of a particular message in a displayed message thread, providing for a change in the intelligibility of at least a part of the particular message with respect to one or more of:
at least one of the other of the messages in the displayed thread; and
at least some of the other part of the particular message.
Figure 12
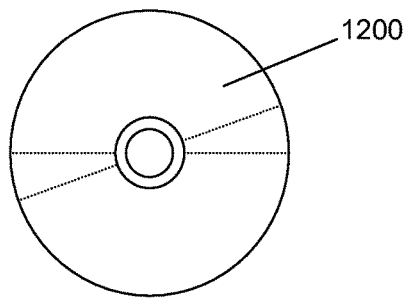

INTELLIGIBILITY OF MESSAGES

RELATED APPLICATION

This application was originally filed as Patent Cooperation Treaty Application No. PCT/CN2013/077452 filed Jun. 19, 2013.

TECHNICAL FIELD

The present disclosure relates to user interfaces, associated methods, computer programs and apparatus. Certain disclosed examples may relate to portable electronic devices, for example so-called hand-portable electronic devices which may be hand-held in use (although they may be placed in a cradle in use). Such hand-portable electronic devices include so-called Personal Digital Assistants (PDAs), mobile telephones, smartphones and other smart devices, and tablet PCs.

The portable electronic devices/apparatus according to one or more disclosed examples may provide one or more audio/text/video communication functions (e.g. tele-communication, video-communication, and/or text transmission (Short Message Service (SMS)/Multimedia Message Service (MMS)/e-mailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

An electronic device may allow a user to read transmitted messages. Messages may be displayed using a particular message layout, font size, font style, colour scheme, and other characteristics.

The listing or discussion of a prior-published document or any background in this specification should not necessarily be taken as an acknowledgement that the document or background is part of the state of the art or is common general knowledge. One or more examples of the present disclosure may or may not address one or more of the background issues.

SUMMARY

In a first example there is provided an apparatus comprising at least one processor and at least one memory including computer program code, the at least one memory and the computer program code configured to, with the at least one processor, cause the apparatus to perform at least the following:
   based on the determined age of a particular message in a displayed message thread, provide for a change in the intelligibility of at least part of the particular message with respect to one or more of:
      at least one of the other of the messages in the displayed message thread; and
      at least some of the other part of the particular message.

For example, a user may view a private text message conversation (e.g., a message thread/exchange requiring transmission of messages from one device to another) with a contact. Older messages in the conversation may be presented in a less intelligible way (e.g., the intelligibility changes to make them less intelligible) as they are likely to be of less interest to the user than more recent messages. Another person looking at the user's displayed messages (for example, reading over the user's shoulder) may not be able to read the less intelligible older messages, and thus the user's private conversation is less likely to be seen by the other person. Given that the particular message is still provided for display, it is not removed from the display screen or archived in this instance.

The apparatus may be configured such that the intelligibility of one or more of at least a part of an image of the particular message or part of the text content of the particular message is changed with respect to one or more of at least one of the other of the messages in the displayed message thread and at least some of the other part of the particular message.

The apparatus may be configured to change the intelligibility of the at least part of the particular message with respect to the message immediately preceding the particular message.

The apparatus may be configured to change the intelligibility of the particular message based on the determined age such that at least some of the displayed messages in the thread are displayed so that progressively older messages have progressively reduced intelligibility. The intelligibility of one or more messages in the message thread may not be changed.

The apparatus may be configured to change the intelligibility of the particular message based on the determined age such that, as the particular message gets older, the at least part of the particular message will have progressively reduced intelligibility with respect to one or more of:
   at least one of the other of the messages in the displayed message thread;
   the intelligibility of the particular message in the displayed message thread immediately preceding the change in intelligibility; and
   the readability of an immediately preceding message in the message thread.

The apparatus may be configured to provide for the change in the intelligibility by reducing the intelligibility of the particular message if the determined age meets a predetermined old-age criterion, the predetermined old-age criterion providing for reduced intelligibility of older messages with respect to newer messages in the displayed message thread. Thus older messages may be harder to read than more recent ones.

The apparatus may be configured to provide for the change in the intelligibility by increasing the intelligibility of the particular message if the determined age meets a predetermined new-age criterion, the predetermined new-age criterion providing for increased intelligibility of newer messages with respect to older messages in the displayed message thread. Thus more recent messages may be easier to read than older ones.

The apparatus may be configured to provide for the change in the intelligibility of the particular message by one or more of: blurring, changing font type, changing font size, changing character ordering, changing contrast, partially covering characters, and changing spacing between characters in the particular message with respect to one or more of:
   at least one of the other of the messages in the displayed message thread; and
   at least some of the other part of the particular message.

The apparatus may be configured to, when the particular message comprises text-based content, provide for the change in the intelligibility of the particular text-based message by changing character ordering between one or more of:

characters in the particular text-based message; and text-based messages in the plurality of text-based messages in the displayed message thread.

The apparatus may be configured to provide for the change in the intelligibility of the particular message by changing the separation between the particular message and one or more of an earlier and a later message displayed in the message thread with respect to one or more of:

at least one of the other of the messages in the displayed message thread;

the intelligibility of the particular message in the displayed message thread immediately preceding the change in intelligibility; and the readability of an immediately preceding message in the message thread.

Doing so may allow more messages to be displayed on a screen, because reducing the spacing between messages gives a higher message density. Varying the message density over the display may maintain/comparatively increase the intelligibility of more recent messages displayed at a lower density compared with older messages which may be displayed with smaller spaces between them (i.e., displayed at a higher message density). The overall flow of the message thread may be presented over a greater number of messages than could be displayed if no change in intelligibility had been made by varying the message separation/density. This may be advantageous if the message thread includes many messages back and forth and it is useful for a reader to see the message flow to understand the conversation.

The apparatus may be configured to perform one or more of:

reduction of the separation between the particular message and an earlier message in the displayed message thread such that the older messages have reduced intelligibility compared with newer messages; and increasing of the separation between the particular message and a later message in the displayed message thread such that the newer messages have increased intelligibility compared with older messages.

A reduction of the separation between the particular message and an earlier message in the message thread may be performed such that the newer messages have increased visibility compared with older messages. An increase of the separation between the particular message and a later message in the message thread may be performed such that the older messages have reduced intelligibility compared with newer messages.

The apparatus may be configured to subsequently change the intelligibility of the at least part of the particular message upon initiation user interaction with the displayed particular message, the intelligibility subsequently changed with respect to the intelligibility of the at least part of the particular message immediately preceding the initiation user interaction. A user may interact with a particular message to initiate a subsequent increase and/or decrease in its changed intelligibility (subsequent to an earlier automatic change based on message age), as a manual alteration of the changed intelligibility.

Of course, the apparatus may be configured to subsequently change the intelligibility without first requiring initiation user interaction such that the change happens automatically after a particular age of the particular received text message is reached.

The particular message may be removed from display in the displayed message thread after a predetermined expiry time. For example, the message may be archived when determined to be a particular age (such as one year, one week, one day, or one hour from transmission/receipt).

The apparatus may be configured to determine the age of the particular message. In other examples, the apparatus itself may not determine the age of the particular message but may receive an indication of the message age from elsewhere.

The apparatus may be configured to compare the determined age with the predetermined old-age criterion.

The apparatus may be configured to compare the determined age with the predetermined new-age criterion.

In other examples, the apparatus itself may not compare the determined age of a message with the predetermined old-age/new-age criterion, but may receive the required age comparison indications from elsewhere.

The determined age of the particular message may be one or more of:

logical age determined according to the position of the message in the displayed message thread with respect to at least one of the other of the messages in the displayed message thread;

actual time age determined according to the time of receipt or transmission of the particular message;

actual date age determined according to the time of receipt or transmission of the particular message; and actual time-date age determined according to the receipt or transmission time-date of the particular message.

The apparatus may be configured to change the intelligibility of the particular message for display by one or more of a display of the apparatus or a display external to the apparatus.

The message thread may comprise messages including one or more of text and image content sent by one or more parties to a particular recipient electronic address.

The recipient electronic address may be associated with one or more of: a public posting website address (such as an address for a forum or comments page), a predefined group posting website address (such as an address for a social media group page), a telephone number, an electronic messaging account for receiving and/or sending messages, an email address, and a social media address (such as a microblog address or personal media space webpage address).

The message thread may be between two or more parties using respective electronic transmission devices.

The message thread may comprise messages submitted to one or more of: an SMS account, an MMS account, an email account, a social media account, an RSS feed account, and an electronic messaging account.

The apparatus may be one or more of: a portable electronic device, a mobile phone, a smartphone, a tablet computer, a surface computer, a laptop computer, a personal digital assistant, a graphics tablet, a pen-based computer, a digital camera, a watch, a non-portable electronic device, a desktop computer, a monitor/display, a household appliance, a server, or a module for one or more of the same.

According to a further example there is provided a computer readable medium comprising computer program code stored thereon, the computer readable medium and computer program code being configured to, when run on at least one processor perform at least the following: based on the determined age of a particular message in a displayed message thread, provide for a change in the intelligibility of at least part of the particular message with respect to one or more of:

at least one of the other of the messages in the displayed message thread; and at least some of the other part of the particular message.

A computer program may be stored on a storage media (e.g. on a CD, a DVD, a memory stick or other non-transitory medium). A computer program may be configured to run on a device or apparatus as an application. An application may be run by a device or apparatus via an operating system. A computer program may form part of a computer program product. Corresponding computer programs for implementing one or more of the methods disclosed are also within the present disclosure and encompassed by one or more of the described examples.

According to a further example, there is provided a method, the method comprising: based on the determined age of a particular message in a displayed message thread, providing for a change in the intelligibility of at least a part of the particular message with respect to one or more of:

at least one of the other of the messages in the displayed message thread; and at least some of the other part of the particular message.

According to a further example there is provided an apparatus comprising: means for providing for a change in the intelligibility of at least a part of the particular message based on the determined age of a particular in a displayed message thread with respect to one or more of:

at least one of the other of the messages in the displayed message thread; and at least some of the other part of the particular message.

The present disclosure includes one or more corresponding aspects, examples or features in isolation or in various combinations whether or not specifically stated (including claimed) in that combination or in isolation. Corresponding means and corresponding function units (e.g., message age determiner, message display, message intelligibility changer) for performing one or more of the discussed functions are also within the present disclosure.

The above summary is intended to be merely exemplary and non-limiting.

BRIEF DESCRIPTION OF THE FIGURES

A description is now given, by way of example only, with reference to the accompanying drawings, in which:

FIGS. 4a-4d illustrate example displayed two-way text-based message threads/exchanges showing intelligibility changing with message age, and an effect of user interaction with a displayed message, according to examples of the present disclosure;

FIGS. 5a-5j illustrate example displayed two-way text-based message threads/exchanges showing different ways of changing message intelligibility according to examples of the present disclosure;

FIGS. 8a-8b illustrate example displayed received text-based message threads from one more contacts according to examples of the present disclosure;

FIGS. 9a-9b illustrate example displayed received MMS message threads in which a message contains an image according to examples of the present disclosure;

FIGS. 10a-10b each illustrate an apparatus in communication with a remote computing element;

FIG. 11 illustrates a flowchart according to an example method of the present disclosure; and FIG. 12 illustrates schematically a computer readable medium providing a program.

DESCRIPTION OF EXAMPLE ASPECTS

Figure 1:
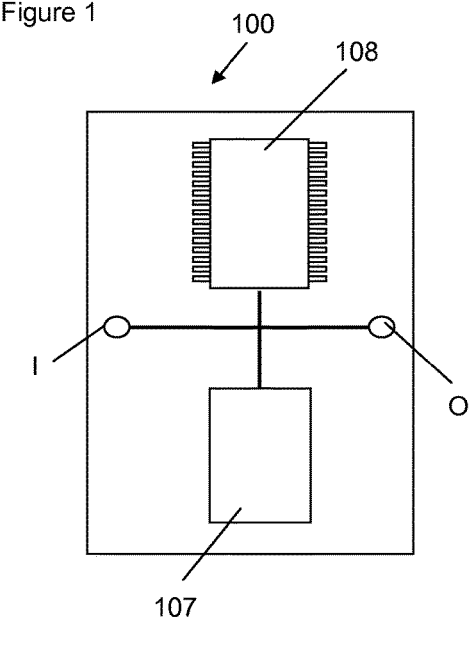
FIG. 1 illustrates an example apparatus comprising a number of electronic components, including memory and a processor, according to one example of the present disclosure.

Many electronic devices allow a user to view messages. Examples include chat messages; e-mails; text messages in a text messaging conversation; received RSS news feed messages; MMS messages containing text, images and/or movies, and social media messages. Many users take a portable electronic device with them wherever they go, and may be able read and access messages. This includes use of the portable device in public places, such as on buses, on trains, in shops and in cafés. Messages may be presented for viewing by a user in an organised logical way, such as in a chronologically ordered conversation between the user and a friend. While this helps the user easily see what has been said in a messaging exchange, it may also be easy for a stranger in a public place to look at the user's device and also readily see what has been said, thereby invading the user's privacy.

It may be that a user does not want previously sent/received messages from being easily read by others. For example, a user may be composing a text message for transmission to a friend. The user may have sent and/or received private messages in the earlier messaging conversation which is displayed along with the message currently being composed. The user may not wish these earlier messages to be easily intelligible by another person, such as a nearby passenger on a train. Thus it may be desirable to hide the contents of a message thread from third parties who may be looking over the user's shoulder, to protect the user's privacy.

It may be that as a messaging thread/conversation grows with the addition of new messages, older messages will be removed from display from a screen to make space for the new messages to be displayed. However, the user may still have a display screen full of messages which he may not wish another person to see. In some examples, only the most recent message may be displayed. This prevents other people from looking at older messages in the conversation, but also means the user cannot see the older messages. This may be undesirable as no information is presented to the user about the flow of the conversation, such as the times and dates of previous messages, what was said in the previous messages, and the structure of the conversation.

It may be that a user is less interested in older received messages and more interested in more recently received messages. For example, if a user is reviewing received social media text and image based messages, the user may be more interested in more recently received messages as these are more likely to relate to current events. The user may be less interested in older messages as these may relate to past events. The user may, however, still wish to be able to easily read the older messages alongside the more recent messages, for example if the more recent messages refer back to older messages.

Examples discussed herein may be considered to, based on the determined age of a particular message in a displayed message thread, provide for a change in the intelligibility of at least a part of the particular message with respect to one or more of: at least one of the other of the messages in the displayed message thread; and at least some of the other part of the particular message.

Advantageously, in certain examples, a user may be able to view a series of messages on a display with increased privacy from other passers-by looking at the display due to, for example, the intelligibility of older messages changing to become less easily intelligible than more recent messages. Advantageously, in certain examples, a user may be able to review a greater number of messages in a display due to old messages occupying less display space than more recent messages Thereby, the more recent messages remain readily intelligible while older messages are less dominant on the display screen, but are still visible.

Other examples depicted in the figures have been provided with reference numerals that correspond to similar features of earlier described examples. For example, feature number 100 can also correspond to numbers 200, 300 etc. These numbered features may appear in the figures but may not have been directly referred to within the description of these particular examples. These have still been provided in the figures to aid understanding of the further examples, particularly in relation to the features of similar earlier described examples.

FIG. 1 shows an apparatus 100 comprising memory 107, a processor 108, input I and output O. In this example only one processor and one memory are shown but it will be appreciated that other examples may utilise more than one processor and/or more than one memory (e.g. same or different processor/memory types).

In this example the apparatus 100 is an Application Specific Integrated Circuit (ASIC) for a portable electronic device with a touch sensitive display. In other examples the apparatus 100 can be a module for such a device, or may be the device itself, wherein the processor 108 is a general purpose CPU of the device and the memory 107 is general purpose memory comprised by the device. The display, in other examples, may not be touch sensitive.

The input I allows for receipt of signalling to the apparatus 100 from further components, such as components of a portable electronic device (like a touch-sensitive or hover-sensitive display) or the like. The output O allows for onward provision of signalling from within the apparatus 100 to further components such as a display screen, speaker, or vibration module. In this example the input I and output O are part of a connection bus that allows for connection of the apparatus 100 to further components.

The processor 108 is a general purpose processor dedicated to executing/processing information received via the input I in accordance with instructions stored in the form of computer program code on the memory 107. The output signalling generated by such operations from the processor 108 is provided onwards to further components via the output O.

The memory 107 (not necessarily a single memory unit) is a computer readable medium (solid state memory in this example, but may be other types of memory such as a hard drive, ROM, RAM, Flash or the like) that stores computer program code. This computer program code stores instructions that are executable by the processor 108, when the program code is run on the processor 108. The internal connections between the memory 107 and the processor 108 can be understood to, in one or more examples, provide an active coupling between the processor 108 and the memory 107 to allow the processor 108 to access the computer program code stored on the memory 107.

In this example the input I, output O, processor 108 and memory 107 are all electrically connected to one another internally to allow for electrical communication between the respective components I, O, 107, 108. In this example the components are all located proximate to one another so as to be formed together as an ASIC, in other words, so as to be integrated together as a single chip/circuit that can be installed into an electronic device. In other examples one or more or all of the components may be located separately from one another.

Figure 2:
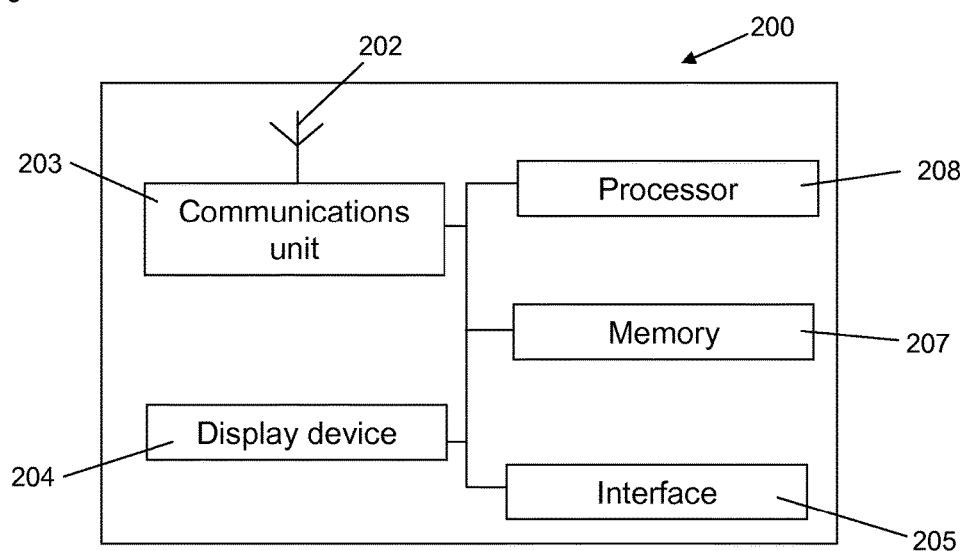
FIG. 2 illustrates an example apparatus comprising a number of electronic components, including memory, a processor and a communication unit, according to another example of the present disclosure.

FIG. 2 depicts an apparatus 200 of a further example, such as a mobile phone. In other examples, the apparatus 200 may comprise a module for a mobile phone (or PDA or audio/video player), and may just comprise a suitably configured memory 207 and processor 208.

The example of FIG. 2 comprises a display device 204 such as, for example, a liquid crystal display (LCD), e-lnk or touch-screen user interface. The apparatus 200 of FIG. 2 is configured such that it may receive, include, and/or otherwise access data. For example, this example 200 comprises a communications unit 203, such as a receiver, transmitter, and/or transceiver, in communication with an antenna 202 for connecting to a wireless network and/or a port (not shown) for accepting a physical connection to a network, such that data may be received via one or more types of networks. This example comprises a memory 207 that stores data, possibly after being received via antenna 202 or port or after being generated at the user interface 205. The processor 208 may receive data from the user interface 205, from the memory 207, or from the communication unit 203. It will be appreciated that, in certain examples, the display device 204 may incorporate the user interface 205. Regardless of the origin of the data, these data may be outputted to a user of apparatus 200 via the display device 204, and/or any other output devices provided with apparatus. The processor 208 may also store the data for later use in the memory 207. The memory 207 may store computer program code and/or applications which may be used to instruct/enable the processor 208 to perform functions (e.g. read, write, delete, edit or process data).

Figure 3:
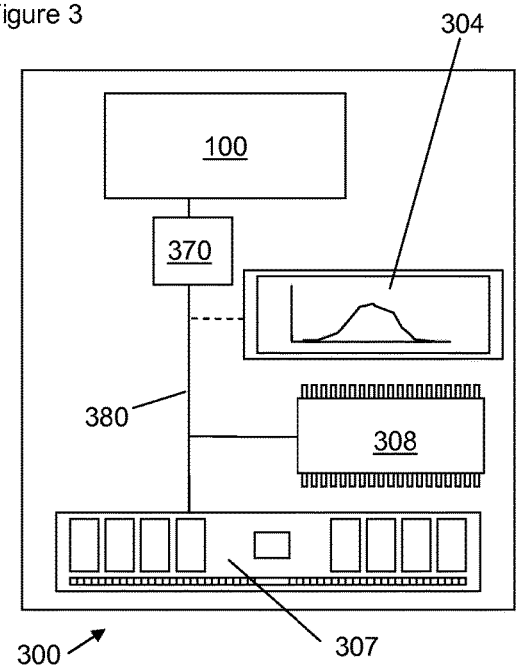
FIG. 3 illustrates an example apparatus comprising a number of electronic components, including memory and a processor, according to another example of the present disclosure.

FIG. 3 depicts a further example of an electronic device 300 comprising the apparatus 100 of FIG. 1. The apparatus 100 can be provided as a module for device 300, or even as a processor/memory for the device 300 or a processor/memory for a module for such a device 300. The device 300 comprises a processor 308 and a storage medium 307, which are connected (e.g. electrically and/or wirelessly) by a data bus 380. This data bus 380 can provide an active coupling between the processor 308 and the storage medium 307 to allow the processor 308 to access the computer program code. It will be appreciated that the components (e.g. memory, processor) of the device/apparatus may be linked via cloud computing architecture. For example, the storage device may be a remote server accessed via the internet by the processor.

The apparatus 100 in FIG. 3 is connected (e.g. electrically and/or wirelessly) to an input/output interface 370 that receives the output from the apparatus 100 and transmits this to the device 300 via data bus 380. Interface 370 can be connected via the data bus 380 to a display 304 (touch-sensitive or otherwise) that provides information from the apparatus 100 to a user. Display 304 can be part of the device 300 or can be separate. The device 300 also comprises a processor 308 configured for general control of the apparatus 100 as well as the device 300 by providing signalling to, and receiving signalling from, other device components to manage their operation.

The storage medium 307 is configured to store computer code configured to perform, control or enable the operation of the apparatus 100. The storage medium 307 may be configured to store settings for the other device components. The processor 308 may access the storage medium 307 to retrieve the component settings in order to manage the operation of the other device components. The storage medium 307 may be a temporary storage medium such as a volatile random access memory. The storage medium 307 may also be a permanent storage medium such as a hard disk drive, a flash memory, a remote server (such as cloud storage) or a non-volatile random access memory. The storage medium 307 could be composed of different combinations of the same or different memory types.

Examples discussed below show that, as a message ages, its contents are concealed by reducing the intelligibility of the aging message. Generally, messages are increasingly less intelligible as they age, either based on their actual age (based on the length of time that has elapsed since they were sent/received) or their logical age (based on the position of the message within the thread/conversation).

FIGS. 4a-4d, 5a-5j, 6a-6b, 7a-7d and 8a-8b are examples of messages which are text-based messages. The change in intelligibility may be considered a change in readability of the text in the text-based messages. It will be appreciated that the term "readability" in relation to text-based messages corresponds to the term "intelligibility" which applies to messages containing text and/or other types of content (e.g., image/video content).

FIGS. 4a-4d illustrate examples of an apparatus/device 400 comprising a touch-sensitive display screen 402. Displayed is a two-way text-based messaging conversation in which received messages 404, 408, 410 are shown in speech bubbles from the right of the display 402 and sent messages 406, 412 are shown in speech bubbles from the left of the display 402. The time and date of reception of the received messages 414, 418, 420, and the time and date of transmission of the sent messages 416, 422 is also displayed for each message (although in other examples the message time/date need not be indicated on the display).

In FIG. 4a there is no change in readability applied to the messages in the conversation. Each message is displayed with substantially the same readability. Each message in the conversation may not be displayed identically. Formatting differences may be applied to the messages while the overall readability of each message remains substantially the same compared with other messages in the conversation. In this example messages are shown in speech bubbles from the left or right depending on the message originator (the third party or the user). For example, received messages 404, 408, 410 may be shown in blue speech bubbles whereas sent messages 406, 412 may be shown in green speech bubbles. As another example received messages 404, 408, 410 may be displayed in a square speech bubble and sent messages 406, 412 may be displayed in round speech bubbles. As a further example, sent 406, 412 and received 404, 408, 410 messages may not be displayed in speech bubbles but each message may be displayed with an indicator of the author, such as a name and/or avatar/icon corresponding to the third party sender and the user/recipient, so the reader can easily see which messages were sent and which were received.

FIGS. 4b and 4c shows a change in the readability of text-based messages 404, 406, 408, 410 in the message thread. The change in readability is based on the determined age of the messages 404, 406, 408, 410 in the thread with respect to at least one of the other messages 412 in the displayed message thread; in this example with respect to the most recent message 412. The change in readability is also based on the readability of the text-based messages 404, 406, 408, 410 in the displayed message thread immediately preceding the change in readability as shown in FIG. 4a. The messages 404, 406, 408, 410 are still displayed and are still intelligible but are less intelligible than before the change in readability was applied. In other examples a change in readability may render a message illegible.

In FIG. 4b, the messages 404, 406, 408, 410, 412 have reduced readability based on the date on which they were sent by the device 400 or received by the device 400. That is, the most recent received message 412 received on the 19 April is the most intelligible. The two earlier messages 408, 410 were received one day earlier on the 18 April. These two messages 408, 410 each have the same level of reduced readability applied to them as they have the same age (they were received on the same day). The two earliest messages displayed 404, 406 are the least intelligible. These messages 404, 460 were received four days earlier than the most recently received message 412, on 13 April. These two messages 404, 406 each have the same level of reduced readability applied to them as they have the same age (they were received on the same day). Thus in this example the change in readability of a message is determined based on actual message age (per day).

In FIG. 4c, the messages 404, 406, 408, 410, 412 have progressively reduced readability based on the logical ages of the messages 404, 406, 408, 410, 412. Each message is more intelligible that the immediately preceding one regardless of the time difference elapsed between the two messages. The most recent message 412 is the most intelligible and the oldest displayed message 404 is the least intelligible.

In FIG. 4d, the user wishes to read a message 404 which has been displayed with reduced readability compared with, for example the latest message 412 in the conversation. The user has touched 424 (or hovered over) the region of the touch-sensitive display 402 overlying the particular message of interest 404. This touch 424 has been detected and associated with the underlying displayed message 404. As a result of the user touch 424 the readability of the message 404 has increased, in this example to the level of readability of the message shown in FIG. 4a before any change in readability was applied to any displayed message. In other examples, a user may repeatedly touch a message to gradually increase (or decrease) the readability of that message in the message thread. A user may wish to increase readability of a particular message if he wishes to check what the message says (for example if the current lighting is too poor to read the message or if the reduction in readability has left the user unsure as to what the message says exactly). A reader may wish to reduce the readability of a particular message if, for example, it describes a secret or a very personal message.

Thus the apparatus/device 400 is configured to change the readability/intelligibility of a particular message 404 upon user interaction 424 with the displayed particular message 404, the readability/intelligibility being changed with respect to the readability/intelligibility of the particular message 404 immediately preceding the user interaction 424. The change may be an increase or decrease.

In this example the readability/intelligibility of the messages 404, 406, 408, 410, 412 has been reduced by applying a shading effect overlaid on each message 404, 406, 408, 410 to obscure the displayed text for that message. Messages with reduced intelligibility may be considered to be obfuscated; that is, the messages have been made more obscure, and are less clear to see, read and/or understand. As illustrated in FIGS. 5a-5j and discussed below there are many different ways in which readability/intelligibility of messages may be changed.

FIGS. 5a-5j illustrate an apparatus/device 500 displaying example two-way text-based message threads showing different ways of changing message readability/intelligibility. In these examples the message readability/intelligibility is progressively reduced based on increasing logical ages of the messages. Thus the earliest received messages 502, 504 have the lowest readability/intelligibility and the most recent messages have the highest readability/intelligibility.

FIG. 5a illustrates a text based message conversation displaying no change in readability over the conversation, in the same way as that shown in FIG. 4a. Each message is displayed with substantially the same readability alongside an indicator 512 of the time and date when the message was sent/received. The time and/or date of message transmission/receipt may not be indicated in some examples.

In the following examples of FIGS. 5b-5j, all messages in the conversation are still displayed. The readability of each message in the conversation progressively decreases as the age of the messages progressively increases (older, less intelligible, messages are displayed closer to the top of the display as indicated by the time and date of transmission/receipt of each message). Messages with reduced readability/intelligibility may be considered to be obfuscated, in that they are less clear to read/understand. The readability of messages other than the latest message 510 is changed with respect to the latest/most recent message 510 in the conversation. The readability of messages 502, 504, 506, 508 except for the most recent message is also changed with respect to the readability of those messages 502, 504, 506, 508 immediately prior to the change in readability being made.

FIG. 5b illustrates the same text based message conversation as shown in FIG. 5a, but with the readability of the messages changed by blurring 550. Older messages are more blurred and have lower readability than more recent messages.

FIG. 5c illustrates the same text based message conversation as shown in FIG. 5a, but with the readability of the messages changed by changing the font type 552 used within each message. Older messages include many different font styles to vary the weight, width, slope, serifs and style throughout words in a message. In this example the oldest displayed message 502 includes font styles 554 which do not correspond to alphabetic script (such as symbol-based fonts) to decrease readability compared with messages displayed using only alphabetic script fonts. More recent messages 506, 508 (but not the most recent message 510) include different font styles per word (but not different font styles within a particular word) to decrease readability compared with the most recent message 510, but have higher readability that the oldest displayed messages 502, 504. By varying the number and types of font styles used, the readability decreases with the age of the messages in the conversation.

FIG. 5d illustrates the same text based message conversation as shown in FIG. 5a, but with the readability of the messages changed by changing the font size 556 used within each message while the same font style is used throughout the conversation. Older messages 502, 504 include many different font sizes over a wide range of font sizes (for example, from 2 point to 20 point). In this example the oldest displayed message 502 includes font sizes which are very small (such as 2 point and 4 point fonts) so as to display certain letters unclearly/ambiguously. More recent messages 506, 508 (but not the most recent message 510) include different font sizes over a smaller range of font sizes (for example, from 8 point to 14 point) than the oldest displayed messages 502, 504 to have a higher readability that the oldest displayed messages 502, 504. By varying the extent to which the characters in the messages have different sizes, the readability decreases with the decreasing age of the messages in the conversation.

FIG. 5e illustrates the same text based message conversation as shown in FIG. 5a, but with the readability of the messages changed by changing the order of characters 558 used within each message. Older messages 502, 504 have almost all characters in the message jumbled from different words, including space characters, so the readability of these messages is very low compared with more recent messages 506, 508. More recent messages 506, 508 (but not the most recent message 510) have only one or two changes in character ordering, such as swapping two adjacent letters in a word (so "Jason" is displayed as "Jsaon" 560), so the more recent messages 506, 508, 510 have higher readability that the oldest displayed messages 502, 504. By varying the extent to which the characters in the messages are jumbled, the readability decreases with the age of the messages in the conversation.

In other examples (not shown) older messages may be changed to a different language than the newer messages. The older messages may then be considered less intelligible given that they are not in, for example, languages of the country in which the device is operating, or at least by virtue of the fact that it is in a different language to the newer message(s). If the user wishes older messages to be less intelligible from his own perspective (for example to be less distracted by older messages when composing a new message), he may choose (in an options menu or similar) that older messages are provided in a language with which he is unfamiliar. If the user wishes older messages to be less intelligible from the perspective of passers-by but he wishes to still be able to read the older messages as readily as newer messages, he may choose older messages to be provided in a second language with which he is familiar but with which passers-by are unlikely to be familiar.

FIGS. 5f and 5g illustrate the same text based message conversation as shown in FIG. 5a, but with the readability of the messages changed by changing the contrast 562 of each displayed message. In FIG. 5f, progressively older messages are shown in increasingly fainter shades of grey rendering older messages 502, 504 less intelligible. In FIG. 5g, progressively older messages are shown in with the colour 564 used to display the characters in the message increasingly closer in colour to the background colour 566 of the speech bubbles in which the message are displayed, to decrease contrast with message age. Other ways by which the contrast of messages can be varied may be used (for example, by displaying a textured background for each message). By varying the level of contrast used to display each message, the readability decreases with the age of the messages in the conversation.

Figure 5I:
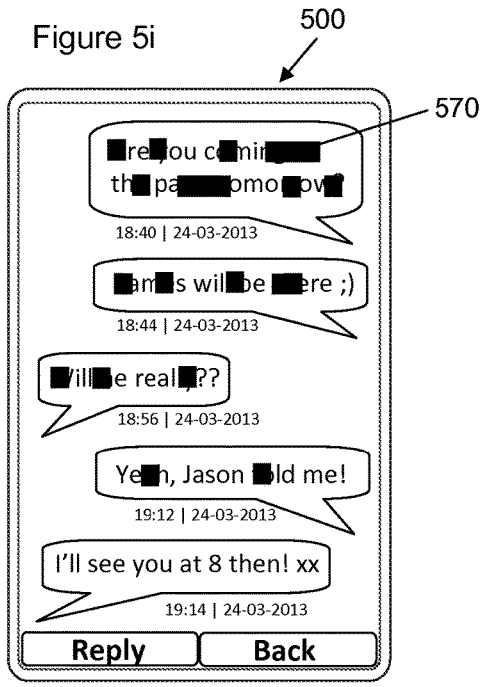

FIGS. 5*h* and 5*i* illustrate the same text based message conversation as shown in FIG. 5*a*, but with the readability of the messages changed by partially covering characters in the messages. In FIG. 5*h*, progressively older messages 502, 504 are shown with increasingly less transparent/more opaque colour overlays 568 over each message, the transparency of the overlay decreasing with increasing message age. In FIG. 5*i*, progressively older message 502, 504 are shown with increasing numbers of characters "blocked out" by opaque colour overlays 570 within the messages. Other ways by which the readability of messages is changed by partially covering characters may be used (for example, by displaying other characters which are not part of the message over portions of the message to obscure the underlying message portions). By varying the level of overlay used to display each message (i.e., the extent to which characters are covered/obscured), the readability decreases with the age of the messages in the conversation. FIG. 5*i* may be considered to show the reduction in intelligibility/readability of a part of a particular message (the blocked-out characters) with respect to some other part of the same message (the non-blocked-out characters).

Figure 5J:
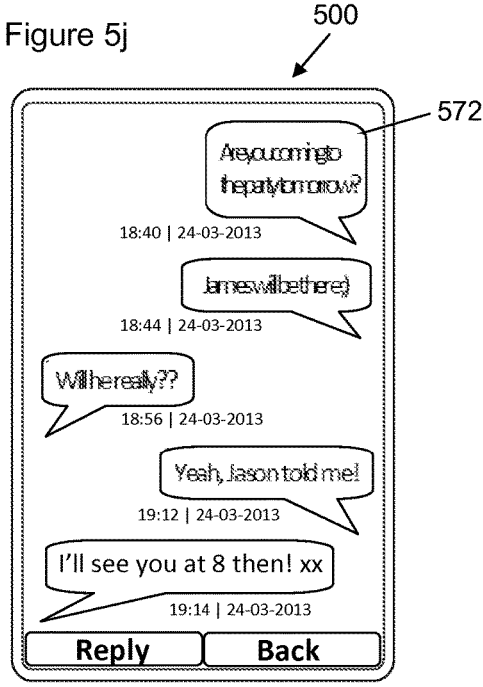

FIG. 5*j* illustrates the same text based message conversation as shown in FIG. 5*a*, but with the readability of the messages changed by changing the spacing between characters used within each message. Older messages 502, 504 have smaller character spacing (for example, −2 points) to cause letters within worlds to overlap and thereby decrease message readability. More recent messages 506, 508 (but not the most recent message 510) have smaller character spacing than the most recent message 510 but wider character spacing that the oldest displayed messages 502, 504 (for example, −0.4 points).

Thus more recent messages 506, 508 in this example have reduced readability/intelligibility compared with the most recent message 510 but higher readability/intelligibility than the oldest displayed message 502. By varying the spacing between characters in the messages, the readability/intelligibility decreases with the age of the messages in the conversation. In this example the character spacing is progressively decreased with increasing message age compared with a message which has no change in readability/intelligibility applied. In other examples, the character spacing within a message may be progressively increased and this may also decrease readability/intelligibility compared with a message in which no change in character spacing has been applied.

Combinations of these effects may be combined to change readability/intelligibility in different ways. For example, readability may be changed by varying font size and font style within a message. As another example, readability may be changed by covering characters in a message and reducing the character spacing. A user may be able to specify what effects are applied, and to what extent, for example in a user settings menu or similar. For example, a particular user may find messages completely unintelligible if the ordering of letters in the message is changed at all, whereas he may find that messages are still intelligible to him even if contrast between the message and the background is reduced. The user may therefore wish to choose optimum settings which he considers allows him to review his message conversations while minimising the chance of a passer-by reading his messages at a glance.

The user may be less likely to be as interested in seeing the exact content of older messages, or of messages which he has composed and sent, because he is probably already familiar with the content. Thus, for the user to review a message conversation, he may not need to see all the older messages displayed very clearly/with high readability. It may be enough for him to see, for example, a blurry, jumbled version of an older message to remember what the message said. However, another person who has not previously read a message may not be able to decipher the reduced readability message because of being displayed in the blurry, jumbled way. The user can advantageously review his message threads with a reduced risk of a third party being able to read over his shoulder or glance at his screen to see what has been said.

While the examples in FIGS. 5*a*-5*j* illustrate five messages in a conversation, the conversation may be larger than can be displayed on a single display. The user may be able to scroll through messages to see earlier/later messages in the thread. The apparatus may be able to automatically re-display messages in a conversation with changed readability if a conversation is scrolled through. Thus, similar variations in readability over the conversation may be provided before and after the message thread is scrolled through. If, for example, the user scrolls down to move the more recent four messages off the bottom of the display and display four older messages at the top of the display, the apparatus may detect the scrolling and change the readability so that the newly most recently displayed message is changed from having low to high readability, with increasingly reduced readability for the newly displayed increasingly older messages.

Changes in readability in a message thread may be applied between characters in a particular text-based message. This is shown, for example, in FIG. 5*e* where the characters are jumbled within each message but each message contains the same characters as before the change in readability, just in a different order. In some examples changes in readability in a message thread may be applied between different messages in the displayed message thread. Thus for example if characters are being jumbled to change readability, characters may be jumbled both within and between displayed messages.

In some examples the apparatus may be configured to provide for the change in the readability by reducing the readability of the particular message if the determined age of the message meets a predetermined old-age criterion. For example, it may be that messages which were sent/received today have no change in readability applied, but messages older than the current date do have a change in readability applied to reduce their readability. In this example the predetermined old age criterion is "older than the current day/date". In other examples the old age criterion may relate to a different actual time period, such as "sent/received over one week ago" or relate to a logical age period, such as "sent/received before the latest three messages in the message thread". The predetermined old-age criterion provides for reduced readability of older messages with respect to newer messages in the text-based message thread.

In some examples the apparatus may be configured to provide for the change in the readability by increasing the readability of the particular text-based message if the determined age of the message meets a predetermined new-age criterion. For example, it may be that messages which were sent/received in the current week are displayed in bold, or in a larger font size, to increase their readability, but messages older than those sent/received in the current week have no change in readability applied (or have reduced readability). In this example the predetermined new-age criterion is "within the current week". In other examples the new-age criterion may relate to a different actual time period, such as "sent/received in the last 10 days" or relate to a logical age period, such as "the most recent two messages in the message thread". The predetermined new-age criterion provides for increased readability of newer messages with respect to older messages in the text-based message thread.

Figure 6A:
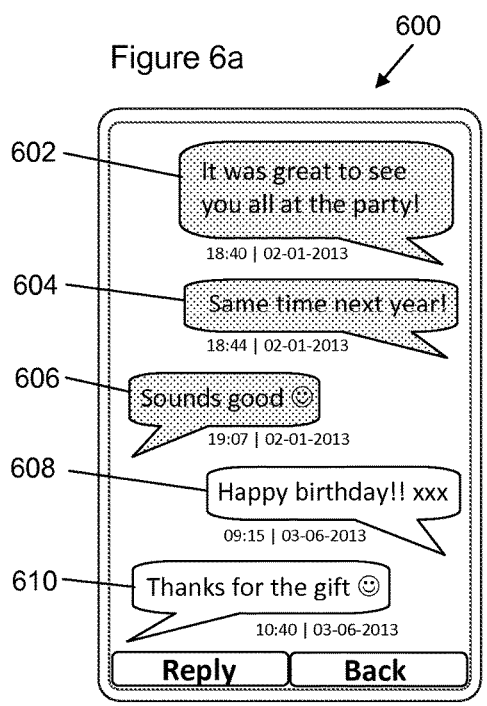
FIGS. 6a-6b illustrate example displayed two-way text-based message threads/exchanges showing changing intelligibility for messages of a predetermined age according to examples of the present disclosure.
Figure 6B:
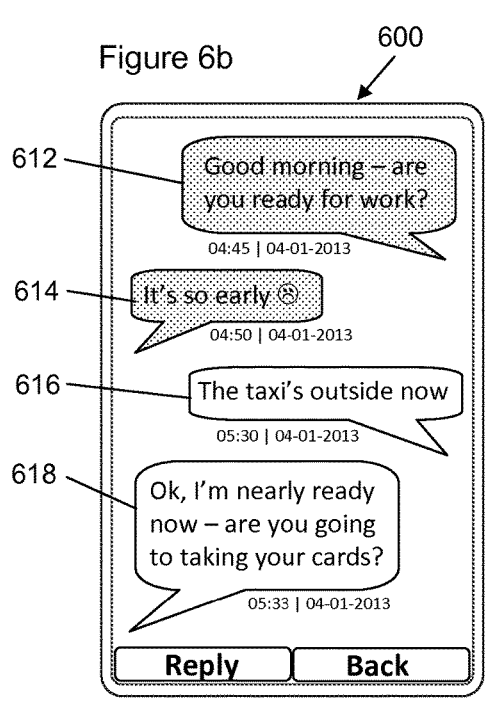

FIGS. 6a-6b illustrate two-way text-based message exchanges/threads showing changing readability for messages of a predetermined age. The message exchange/thread may be, for example, a chat message exchange/thread, an SMS or MMS message exchange/thread, an e-mail exchange/thread, or a social media message posting thread.

In FIG. 6a, an thread of five messages 602, 604, 606, 608, 610 is shown on an apparatus/device 600 between two contacts who send each other messages on special occasions such as at new year and on birthdays (rather than regularly sending messages each day/week, for example). The earliest three messages 602, 604, 606 were sent on the same day, 2 Jan. 2013. The latest two messages 608, 610 were both sent on the same day around six months later, on 3 Jun. 2013. In this example the predetermined age criterion is "current month". Messages older than those sent/received on the current month have changed readability to make them less intelligible. In this way the user can easily see which messages are related to current events without being distracted by messages relating to an event which is not current (not in the current month). The current month (or other time period such as day, week, and year) may be the latest 30/31 days in some examples, or may be the current calendar month in some examples.

In FIG. 6b, a thread of four messages 612, 614, 616, 618 is shown between two work colleagues who are organising meeting for a conference on the morning of 4 Jan. 2013. The earliest two messages 612, 614 were sent within five minutes of each other at 04:45 and 04:50. The latest two messages 616, 618 at the bottom of the display were sent later than 45 minutes from the previous messages, at 05:30 and 05:33. In this example the predetermined age criterion is "within 45 minutes of the immediately preceding message". Messages sent/received earlier than 45 minutes from the immediately following message are displayed with changed readability to make them less intelligible than the most recent messages. In this way the user can easily see which messages are related to current events and messages are visually grouped by the same level of readability based on whether the messages were sent in the same 45 minute period (that is, within the same discussion (group of messages) within a message thread). The user is visually directed to messages relating to current events while being less distracted by messages relating to past events, although the user can review these older messages if they wish to.

The apparatus may be configured to determine an age criterion for messages in a thread based on the time/date distribution profile of messages in the displayed message thread, and provide for a change in readability of a message based on the determined age criterion. For example, if a displayed message thread includes messages sent/received all within the same day, the apparatus may change the readability of messages sent/received over one hour ago to reduce their readability, and/or may change the readability of messages sent/received within the last hour to increase their readability. As another example, if a displayed message thread includes messages sent/received over a three month period, the apparatus may change the readability of messages sent/received within the least week to increase their readability. In this way the most recent, and therefore most currently relevant, messages may be displayed in a more prominent way compared with older, less relevant messages with the apparatus determining what time period may logically be designated as "recent" and what time period may logically be designated as "old". Thus the user can easily see the relevant information with reduced distraction from less relevant messages.

Changes in readability are illustrated in FIGS. 6a and 6b using a partially-transparent overlay to partially cover the characters in the message and obfuscate them. Of course any combination of ways in which the readability may be changed, such as those illustrated in FIGS. 5a-5j, may be used. Changes in readability/obfuscation are shown in FIGS. 6a-6b by showing two levels of readability, higher readability for more recent messages and lower readability for older messages. In other examples the change in readability/obfuscation may progressively change as shown in FIGS. 5a-5j.

FIGS. 7a-7d illustrate an example apparatus/device 700 displaying two-way text-based message threads. Readability/obfuscation changes are shown by varying font size and/or displayed message. Older messages 702, 704 are displayed towards the top of the display, and more recent messages 708, 710 are displayed towards the bottom of the screen, as indicated by the time-date stamps 712 shown for each message. The figures show a message thread/exchange. Messages sent to the user 702, 704, 708 are aligned to the right hand side of the screen, and messages sent by him 706, 710 are aligned to the left. The messages may also be displayed with coloured backgrounds, for example with the sent messages 706, 710 sent on a blue background and the received messages 702, 704, 708 sent on a green background. Such a message layout allows the user to easily see the 'flow' of the message thread (i.e. who has messaged who and in what order) as well as access/view the content of old messages.

Figure 7A:
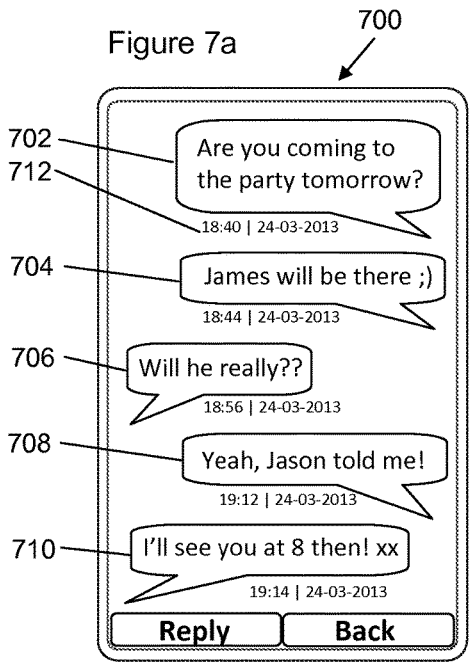
FIGS. 7a-7d illustrate example displayed two-way text-based message threads/exchanges showing intelligibility changing by varying font size and/or displayed message density according to examples of the present disclosure.

In FIG. 7a, there is no change of readability of the displayed messages. All the messages 702, 704, 706, 708, 710 are displayed in the same font size and the messages are equally spaced over the display screen.

Figure 7B:
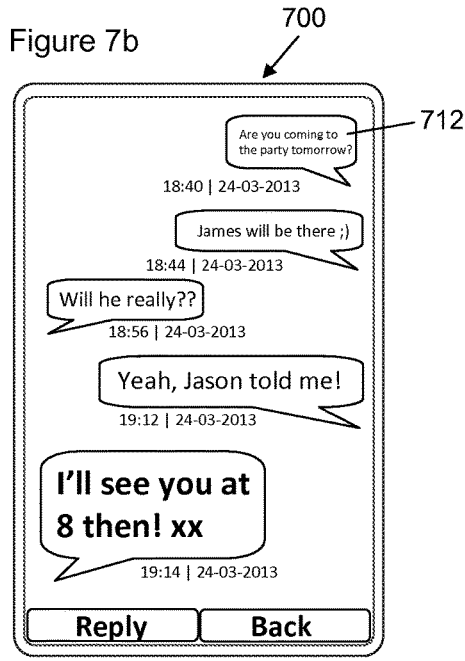

In FIG. 7b the font size 712 used for each message progressively decreases for older messages through the displayed message thread. Thus the most recent messages 708, 710 are more noticeable and stand out compared with them smaller older messages 702, 704.

Figure 7C:
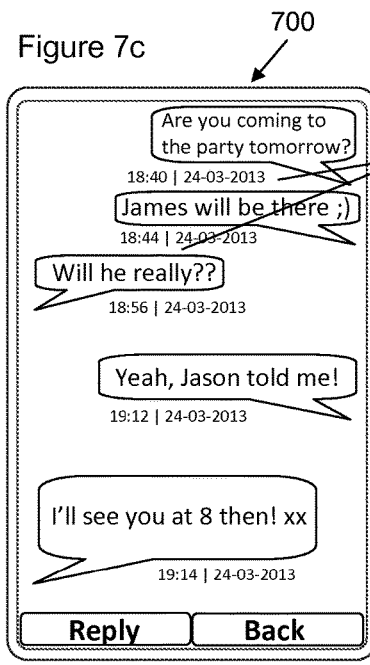

In FIG. 7c the font size used for each message is the same through the displayed message thread, but the density 714 of display of the messages changes over the display screen. Older messages 702, 704 are displayed with a higher density, while more recent messages are 708, 710 displayed with a lower density. Thus the most recent messages 708, 710 are displayed with more surrounding space in a more noticeable layout while the older messages 702, 704 are displayed more closely together in a more cramped layout.

Figure 7D:
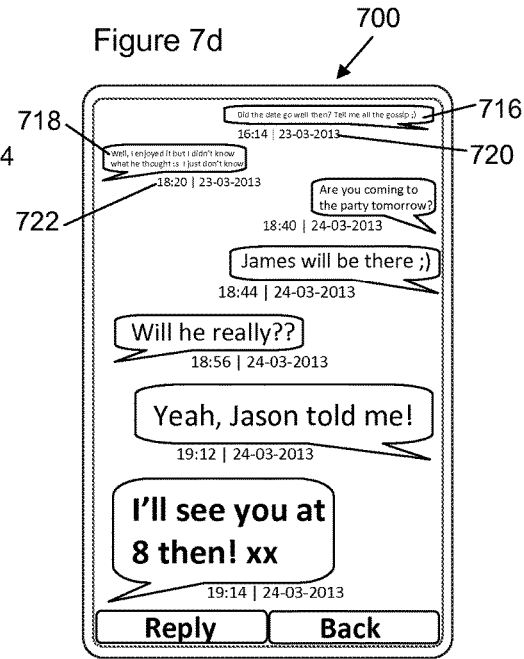

In FIG. 7d both the font size is decreased and the density of messages is increased as the age of the messages increases. Thus the oldest displayed messages 702, 704 are shown in a smaller font in a smaller space per message, and the newer displayed messages 708, 710 are shown in a larger font with a greater space around each message. It can be seen in this example that more messages 716, 718 are displayed in comparison to the display of FIG. 7a in which no change in readability has been applied to the messages in the message thread. Of course in other examples, more messages 716, 718 may be displayed after applying a change in readability to one or more messages in a message thread by reducing the text size but not changing the density of the messages (as in FIG. 7b) or by not changing the text size but increasing the density of the messages with increasing message age (as in FIG. 7c).

In FIGS. 7c and 7d, the older messages in the message thread may be displayed such that the displayed message text itself is not shown, but the message is shown as a horizontal bar. The readability of the message is reduced because the text is not revealed but the message is shown as a bar indicating the message length relative to other messages in the thread. The bar may resemble a bar of a bar chart in some examples. The bar may be a colour corresponding to the sender in the message thread to allow a user to easily see who sent the message. Messages displayed in this way may be considered to resemble a graph/chart of messages indicating the message flow/direction within the message thread, the density of messages (such as which side of the message thread each message was sent from) and the relative length of messages in the thread. Messages displayed in this "bar-chart" way are still provided for display, and in some examples, the user may interact with a particular message (for example by touching it or clicking on it) to reveal the text of that message.

FIG. 7d also shows the size of the time-date stamps 720, 722 for older messages with reduced readability being displayed in a smaller font compared with later messages which are not shown with changed readability. The apparatus may, in some examples, automatically determine how to display (or whether to display at all) information associated with a message with changed readability (such as a time-date stamp or image/avatar, for example). For example, information displayed alongside a corresponding message with reduced readability may also be displayed with reduced readability. The readability of the associated information may be shown with readability changed in the same way as that of the message in some examples, or in a different way in other examples. In some examples the readability of associated information may not change.

For example, if a message is shown displayed in a larger font size to increase readability compared with the message before the change in readability is applied, then an associated timestamp and contact avatar associated with that message may also be displayed in a larger size. As another example, messages displayed with reduced readability due to an increase in message display density (compared with messages which are not shown with changed readability) may not be shown with an associated time/date stamp or contact avatar, because a purpose of increasing display density is to reduce the display area required to display these particular messages. Messages displayed without a change in display density may be shown with an associated time/date stamp and/or avatar. As another example, all messages displayed with any type of reduction in readability may be displayed alongside a blurred contact avatar and contact name so that the message sender is obscured.

A user may be more likely to be interested in the content of newer messages than the older messages, so it may not be necessary to display the older messages in enough detail that they can be easily read (or in some examples be read at all since the text size may be so small as to render the actual words illegible). However, the user can still see how the message exchange has flowed back and forth over time. The message flow can be shown over a greater period of time, as shown in FIG. 7d, by making older messages 702, 704 smaller (with a smaller font size and/or higher message display density than more recent messages 708, 710) so that more messages can be displayed at a time on the screen.

Reducing the readability of older messages by changing the size of the displayed messages density so that a greater number of older messages can be displayed while occupying less screen space may be advantageous if a portion of the display screen is already occupied by non-message content, such as an image, a virtual keyboard, or other virtual control buttons. By displaying older messages at a reduced size (and/or a higher message density), the user can still see the message thread spanning several messages while the newest messages are not reduced in size and are thus still comparatively easy to read. In some examples, the change in readability of messages by displaying older messages over a smaller space compared with more recent messages may be made when changing the displayed content such that a new item is displayed on the screen in a space previously used to display message content. For example, a display may show a series of messages each with the same level of readability. If the user, for example, causes a virtual keyboard to be displayed (for example by selecting a "reply" option to reply to a received message), then the virtual keyboard will occupy display space which was previously used for displaying message content. Rather than remove the older messages from display to make space for the virtual keyboard, the older messages may be displayed in a reduced space (with smaller font size and/or higher message density) while the more recent messages do not change in readability compared with the display before the virtual keyboard was displayed. In this way the user can still see all the messages available before the virtual keyboard was displayed to help him see the flow of conversation and compose his reply.

Because of the layout of the messages as in FIGS. 7a-7d (received messages 706, 710 shown from the right and sent/transmitted messages 702, 704, 710 shown from the left), possibly colour coded according to transmission or receipt for example) it may still be easy for the user to see if the older messages have been sent or received. The user may also be able to see the relative length of each message compared with other messages in the thread. Thus the user is provided with the flow of the message and an indication of message size while more messages can be displayed on a screen at a time. The older messages may also be more difficult for a casual passer-by to read which can increase privacy for the user.

FIGS. 8a-8b illustrate example received text-based message threads displayed on an apparatus/device 800 in which all the displayed messages are received messages. The messages are shown in age order from most recent to least recent from top to bottom of the display. FIG. 8a shows an RSS feed 802 where a single news source provides messages 804, 806, 808, 810 to the user's device relaying current news events. FIG. 8b shows a series of messages 812, 814, 816, 818 received from a social messaging service 820 from a plurality of sources. In these examples, older messages 808, 810; 816, 818 are displayed in a less intelligible way than more recent messages 804, 806; 812, 814. Thus a user is visually directed to the more intelligible, and therefore more recent, received messages. Also, the older messages may be more difficult for a casual passer-by to read which can increase privacy for the user. Older messages may be considered to be obfuscated, as they are more difficult to read and understand than newer, less/non obfuscated messages.

While in FIGS. 8a-8b the readability is shown to decrease by the application of an overlaid shaded region over each message, any manner of reduction of the readability may be applied, such as one or more of varying font size, varying font style, blurring, reducing contrast, re-ordering characters, varying character spacing, reducing font size and increasing message display density, for example.

In changing the readability of a message, in some examples the message may be illegible after the change (for example, all or most of the message may be obscured by an opaque overlying shape, or the message may be blurred so much that the text appears as a grey smear with no identifiable character shapes). In other examples the message may still be legible but be more difficult to read. In a message thread, a user may be happy for messages older than a month, if still displayed in the message thread, to be illegible as they may not be of interest. As another example, in a social media message thread, a user may wish to prevent others from looking at his device display and seeing what messages he has received, but may wish for those messages to still be intelligible/legible.

Although examples above concentrate on decreasing readability of older messages, in some examples it may be that the most current message has an increased relative readability, by keeping the readability of one or more older messages the same, but providing the newer message(s) with a comparatively increased readability (e.g., by displaying the latest message in bold, or in a different colour). Then the user's eye may be drawn to the newest message without being distracted by older messages, although the older messages are displayed for reference if required. Of course, older messages may be obfuscated and newer messages may be displayed with enhanced readability/intelligibility in some examples.

In the above text-based examples, the whole of a particular message is shown with changed intelligibility. Of course, in other examples, a portion less than the whole of a particular message (i.e., a part of the message) may be changed such that the message has reduced intelligibility. For example, in a text-based message, only the numbers may be changed to reduce the intelligibility, because a number may be considered to portray more sensitive information than general word-based text (a number may be, for example, a password, a PIN number, a contact telephone number, or a house number in an address). As another example, in a text-based message, only words beginning with a capital letter may be changed to reduce the intelligibility, because such words may be associated with names of people and places, and therefore be considered to portray more sensitive information than other text. Thus, for example, the intelligibility of a number or a capitalised word may, as a part of a particular message, be changed in a message according to the determined age of the message (thereby reducing the intelligibility of the message as a whole).

FIGS. 9a-9b illustrate an apparatus/device 900 displaying example two-way MMS messages (wherein both text and images/movies may be transmitted and received). In this example, a portion of a message comprising an image is rendered less intelligible by obfuscating the image using pixellation.

FIG. 9a illustrates an MMS message 902 in which a text based message 902 and an image 906 have been transmitted to the apparatus/device 900. The text and image are presented with a high intelligibility (that is, they have not been obscured). Thus the reader will be able to see the details in the image 906 and read the accompanying text message 904.

FIG. 9b illustrates that a subsequent message 908 has been added to the message thread; in this example the subsequent message 908 is a reply to the sender of the image 906. In this example, the intelligibility of the portion of the message 902 having image content has been reduced compared with the way the image was displayed before the reply message 908 was added to the message thread. In this example the intelligibility of the image 910 has been reduced by minimising the colour scheme and pixellating the image 910. The intelligibility of the text based portion of the older message 904 has not changed in this example.

Thus, for example, in a mixed media message (such as a message containing text, still images and/or movies), the intelligibility of one or some, but not all, of the message components may change. The change may be considered to be with respect to at least one of the other of the messages in the displayed message thread. In some examples comprising image or movie content, the intelligibility of some of the image/movie may be reduced, but not all of the image/movie. For example, regions of an image in a message determined to show a human face may be obfuscated to reduce the message intelligibility but other non-facial elements in the image may not change. Thus the intelligibility of a portion (e.g., a facial portion) of an image may, as a part of a particular message, be changed in a message according to the determined age of the message (thereby reducing the intelligibility of the message as a whole). In other cases, there may just be an image exchange without text content. For example, older image messages may be obfuscated with respect to newer image messages.

The apparatus may be configured to subsequently change the readability of the particular message upon initiation user interaction with the displayed particular message, the readability subsequently changed with respect to the readability of the particular message immediately preceding the initiation user interaction. A user may interact with a particular message to initiate an increase and/or decrease in its readability. For example, on a touch-sensitive display, a user may touch a particular message and slide to the left over it to initiate an increase in the message's readability, and may touch a particular message and slide to the right over it to initiate a decrease in the message's readability. Thus, for example, after the apparatus has changed the readability of one or more particular messages in a message thread, the user may be able to interact with a particular one of the messages for which the readability has changed in order to manually adjust the level of readability of that particular message. For example, if a relatively recent message has its level of readability changed to be less intelligible but the message is still intelligible and the message contains particularly private content, the user may be able to interact with that message (for example, by tapping it) and "tweak" the level of readability to decrease it further.

In some examples a user may be able to interact with a displayed message, for example by touching the message on a touch sensitive screen or by clicking on the message with a pointer. In using a device with eye-control, which tracks the location of a user's eyes to determine what the user is looking at, the user may be able to look at a message to cause a user interaction with that message. In some examples the user interaction may cause the readability of the message to change so that the user can read a particular message more easily or obscure a particular message to make it less intelligible. The user may wish to, for example, obscure a particularly private message in a message conversation so that others cannot read it if they look at his device display. An increase/decrease in readability caused by the user interaction as described above may remain until a further user input is received in some examples, or may be a temporary increase in readability for a predetermined period of time in other examples.

FIG. 10a shows an example of an apparatus 1000 in communication with a remote server. FIG. 10b shows an example of an apparatus 1000 in communication with a "cloud" for cloud computing. In FIGS. 10a and 10b, apparatus 1000 (which may be apparatus 100, 200 or 300) is also in communication with a further apparatus 1002. The apparatus 1002 may be a touch screen display for example. In other examples, the apparatus 1000 and further apparatus 1002 may both be comprised within a device such as a portable communications device or PDA. Communication may be via a communications unit, for example.

FIG. 10a shows the remote computing element to be a remote server 1004, with which the apparatus 1000 may be in wired or wireless communication (e.g. via the internet, Bluetooth, NFC, a USB connection, or any other suitable connection as known to one skilled in the art). In FIG. 10b, the apparatus 1000 is in communication with a remote cloud 1010 (which may, for example, be the Internet, or a system of remote computers configured for cloud computing). For example, the messages may be stored remotely and be accessible by the apparatus 1000. As another example, the apparatus 1000 may provide for the change in readability of a message by allocating a level of readability to that message, and the apparatus 1000 may be configured to pass this readability level to a remote server 1004/cloud 1010 for varying the readability of the message when displayed in a message thread on a display apparatus 1002. In other examples the remote server 1004/cloud 1010 may provide the respective messages with changed readability to the apparatus 1000, 1002. The messages may or may not be stored on the server 1004 or cloud 1010.

FIG. 11a illustrates a method 1100 according to an example of the present disclosure. The method comprises, based on the determined age of a particular message in a displayed message thread, providing for a change in the intelligibility of at least a part of the particular message with respect to one or more of: at least one of the other of the messages in the displayed message thread; and at least some of the other part of the particular message.

FIG. 12 illustrates schematically a computer/processor readable medium 1200 providing a program according to an example of this disclosure. In this example, the computer/processor readable medium is a disc such as a Digital Versatile Disc (DVD) or a compact disc (CD). In other examples, the computer readable medium may be any medium that has been programmed in such a way as to carry out the functionality herein described. The computer program code may be distributed between the multiple memories of the same type, or multiple memories of a different type, such as ROM, RAM, flash, hard disk, solid state, etc.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/ or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
    at least one processor; and
    at least one memory including computer program code,
    the at least one memory and the computer program code configured to, with the at least one processor, cause the apparatus to perform at least the following:
    determine an age of a particular received message in a displayed message thread comprising transmitted messages;
    based on the determined age of the particular message in the displayed message thread, provide for a change in intelligibility of at least part of the particular message with respect to one or more of:
    at least one of the other of the messages in the displayed message thread; or
    at least some of the other part of the particular message; and
    in response to a user interaction comprising at least one of a selection of at least one transmitted message in the message thread or a scrolling of at least one transmitted message in the message thread, cause the intelligibility of the at least one transmitted message to increase or decrease according to the user interaction.

2. The apparatus according to claim 1, wherein the apparatus is configured such that the intelligibility of one or more of at least a part of an image of the particular message or part of the text content of the particular message is changed with respect to one or more of at least one of the other of the messages in the displayed message thread and at least some of the other part of the particular message.

3. The apparatus according to claim 1, wherein the apparatus is configured to change the intelligibility of the at least part of the particular message with respect to the message immediately preceding the particular message.

4. The apparatus according to claim 1, wherein the apparatus is configured to change the intelligibility of the particular message based on the determined age such that at least some of displayed messages in the thread are displayed so that progressively older messages have progressively reduced intelligibility.

5. The apparatus according to claim 1, wherein the apparatus is configured to change the intelligibility of the particular message based on the determined age such that, as the particular message gets older, the at least part of the particular message will have progressively reduced intelligibility with respect to one or more of:
    at least one of the other of the messages in the displayed message thread;
    the intelligibility of the particular message in the displayed message thread immediately preceding the change in readability; and
    the readability of an immediately preceding message in the message thread.

6. The apparatus according to claim 1, wherein the apparatus is configured to provide for the change in the intelligibility by reducing the intelligibility of the particular message if the determined age meets a predetermined old-age criterion, the predetermined old-age criterion providing for reduced intelligibility of older messages, with respect to newer messages, in the displayed message thread.

7. The apparatus according to claim 1, wherein the apparatus is configured to provide for the change in the intelligibility by increasing the intelligibility of the particular message if the determined age meets a predetermined new-age criterion, the predetermined new-age criterion providing for increased intelligibility of newer messages, with respect to older messages, in the displayed message thread.

8. The apparatus according to claim 1, wherein the apparatus is configured to provide for the change in the intelligibility of the particular message by one or more of: blurring, changing font type, changing font size, changing character ordering, changing contrast, partially covering characters, and changing spacing between characters in the particular message with respect to one or more of:
    at least one of the other of the messages in the displayed message thread; and
    at least some of the other part of the particular message.

9. The apparatus according claim 1, wherein the apparatus is configured to provide for the change in the intelligibility of the particular message by changing the separation between the particular message and one or more of an earlier and a later message displayed in the message thread with respect to one or more of:
    at least one of the other of the messages in the displayed message thread;
    the intelligibility of the particular message in the displayed message thread immediately preceding the change in readability; and
    the readability of an immediately preceding message in the message thread.

10. The apparatus according to claim 1, wherein the apparatus is configured to perform one or more of:
    reduction of the separation between the particular message and an earlier message in the displayed message thread such that the older messages have reduced intelligibility compared with newer messages; and
    increasing of the separation between the particular message and a later message in the displayed message thread such that the newer messages have increased intelligibility compared with older messages.

11. The apparatus according to claim 1, wherein the apparatus is configured to subsequently change the intelligibility of the at least part of the particular message upon initiation user interaction with the displayed particular message, the intelligibility subsequently changed with respect to the intelligibility of the at least part of the particular message immediately preceding the initiation user interaction.

12. The apparatus according to claim 1, wherein the determined age of the particular message is one or more of:
    logical age determined according to the position of the message in the displayed message thread with respect to at least one of the other of the messages in the displayed message thread;
    actual time age determined according to the time of receipt or transmission of the particular message;
    actual date age determined according to the time of receipt or transmission of the particular message; and
    actual time-date age determined according to the receipt or transmission time-date of the particular message.

13. The apparatus according to claim 1, wherein the apparatus is configured to change the intelligibility of the particular message for display by one or more of a display of the apparatus or a display external to the apparatus.

14. The apparatus according to claim 1, wherein the message thread comprises messages including one or more of text and image content sent by one or more parties to a particular recipient electronic address.

15. The apparatus according to claim 14, wherein the recipient electronic address is associated with one or more of: a public posting website address, a predefined group posting website address, a telephone number, an electronic messaging account for receiving and/or sending messages, an email address, and a social media address.

16. The apparatus according to claim 1, wherein the message thread is between two or more parties using respective electronic transmission devices.

17. The apparatus according to claim 1, wherein the message thread comprises messages submitted to one or more of: an SMS account, an MMS account, an email account, a social media account, an RSS feed account, and an electronic messaging account.

18. The apparatus according to claim 1, wherein the apparatus is one or more of: a portable electronic device, a mobile phone, a smartphone, a tablet computer, a surface computer, a laptop computer, a personal digital assistant, a graphics tablet, a pen-based computer, a digital camera, a watch, a non-portable electronic device, a desktop computer, a monitor/display, a household appliance, a server, or a module for one or more of the same.

19. A method comprising:
   based on the determined age of a particular message in a displayed message thread comprising transmitted messages, providing for a change in intelligibility of at least a part of the particular message with respect to one or more of:
   at least one of the other of the messages in the displayed message thread; or
   at least some of the other part of the particular message; and
   in response to a user interaction comprising at least one of a selection of at least one transmitted message in the message thread or a scrolling of at least one transmitted message in the message thread, causing the intelligibility of the at least one transmitted message to increase or decrease according to the user interaction.

20. A non-transitory computer readable medium comprising computer program code stored thereon, the computer readable medium and computer program code being configured to, when run on at least one processor perform at least the following:
   determine an age of a particular message in a displayed message thread comprising transmitted messages;
   based on the determined age of the particular message in the displayed message thread, provide for a change in intelligibility of at least part of the particular message with respect to one or more of:
   at least one of the other of the messages in the displayed message thread; or
   at least some of the other part of the particular message; and
   in response to a user interaction comprising at least one of a selection of at least one transmitted message in the message thread or a scrolling of at least one transmitted message in the message thread, cause the intelligibility of the at least one transmitted message to increase or decrease according to the user interaction.

* * * * *